Patented May 4, 1926.

1,583,713

UNITED STATES PATENT OFFICE.

JAMES RANKIN GARROW, OF LONDON, ENGLAND, ASSIGNOR, BY MESNE ASSIGNMENTS, TO NOVOCRETE COMPANY OF AMERICA, INCORPORATED, OF NEW YORK, N. Y., A CORPORATION OF NEW YORK.

MIXING COMPOSITION FOR USE WITH WOOD AGGREGATES AND STRUCTURES.

No Drawing.    Application filed September 25, 1923.    Serial No. 664,797.

*To all whom it may concern:*

Be it known that I, JAMES RANKIN GARROW, a subject of the King of Great Britain, residing at London, England, have invented certain new and useful Improvements in Mixing Compositions for Use with Wood Aggregates and Structures, of which the following is a specification.

This invention relates to the use of wood or similar bodies in conjunction with cement, either for the production of compositions in which sawdust is used for the manufacture of concrete blocks, floorings, or the like, or in the building of structures, in which timber-work is reinforced by concrete, or vice versa. The invention is also applicable for use with other fibrous materials, for example, ground peat, disintegrated wood or wood pulp, coir refuse, ground cork, and the like.

In order to avoid redundancy of expression, the invention will be described hereinafter in connection with wood, as this is the primary application at the moment, and it should be understood in connection with the other substances mentioned that they include the commonly known variations, for instance, concrete is included under the term "cement", or a mixture of cement and sand, lime and sand, and the like.

The object of the present invention is to perfect the adhesion of such cement to wood, or similar bodies, as mentioned above, which heretofore has been a condition rarely accomplished, and with very material advantage in many cases when brought about.

The process according to the present invention consists in utilizing a sensitive solution of a metallic salt, that is, a solution which is of such a degree of alkalinity that the minimum amount of alkali only need be added to produce the precipitation of a mineral compound, with a view to closing the pores of the wood by the formation of a solid compound obtained by the reaction of the cement with the solution, or by the reaction of the cement in combination with an added reagent of basic character, such for example as free alkali, it being understood that the last named addition is only necessary when the cement to be employed does not provide the necessary excess to cause precipitation of the solid compound.

In a process according to this invention a salt solution is used of such sensitiveness with regard to the tendency it possesses for a mineral compound to precipitate therefrom that the amount of cement or basic material necessary to promote reaction is reduced to a minimum, so that the by-products are beneficial to the setting, hardening and density of the mass, and it should be understood that in the majority of cases, depending to some extent on the class of cement employed, the addition of extra basic material is not necessary, especially when dealing with cement of a calcareous nature.

As an example of carrying the present invention into effect with cement such as Portland cement, which is of a notable calcareous nature, the following is given:

A solution of an iron salt such as ferric chloride or iron perchloride is rendered sensitive as set forth by means of the addition of an alkali or an alkali salt such as oxide or hydrate, or carbonate or bicarbonate of sodium, potassium, or any of the alkali earths such as of calcium, the amount added being such that a slight excess of that amount would provide a permanent precipitate. The process, however, would not be injured if a permanent precipitate is formed in the liquor to a very small extent. The wood, or similar fibre, or granular powder of such (for instance, sawdust or wood flour) is then impregnated with the solution previous to being mixed with the Portland cement, to which latter a suitable aggregate may have been added, such as limestone or calcium hydrate. The lime in the cement, or aggregate, if the latter is used, by providing the required excess of alkali, reacts with the absorbed solution, the iron being precipitated partly in and on the wood and partly in the cement mixture.

The invention may also be employed in dealing with other than calcareous cements, for example, that known as cement fondu, in the manufacture of which an aluminous mineral, such as bauxite, is used, also that cement made from burnt shale or spent shale, i. e., shale from which the oil content has been extracted, which said cements consist largely of alumina and silica combined or free. In the event of such cements not providing the necessary elements to precipitate the mineral compound, extra alkali or other basic substance can be introduced by mixing with the cement or with the impregnated wood.

If a sufficient proportion of alkali or base is available from such cements, bringing them into contact with the wood as before stated would produce the required mineral compound.

As an example of the treatment when say, an aluminous or bauxite cement, such as cement fondu, is employed, the following is given:—

The solution of ferric chloride may be rendered sensitive as set forth in any well known way, for example, by the addition of an excess of ferric hydrate, the solution rendered basic eventually providing the permanent precipitate required, in this case ferric hydrate. Thereafter, the wood is impregnated with the solution, and when mixed with the aluminous or bauxite cement the solution will be decomposed by the alumina or other alkali or base present in the cement, or if such alkali or base is not sufficient to promote the reaction a small addition of lime or similar alkaline base may be made to expedite the reaction.

Various metallic salts may be prepared and used in the way before described, for instance, salts of aluminum, chromium and the like, or mixtures thereof, provided that the by-products formed by the reaction are not deleterious to the cement employed.

The reaction referred to results in the surface of the wood being mineralized or petrified, or it may be considered that the solid compound formed by the addition of the cement acts as a link or layer between the cement and the wood, enabling the former to adhere efficiently to the wood.

It should be clear from the foregoing that the present invention is applicable not only to fibrous materials in granular form but also to such materials in slabs, particularly also for the treatment of reinforcing wood rods used in strengthening concrete.

It will be apparent from the foregoing that the characteristic feature of the present invention is that a particular kind of salt solution is used, viz, that which is so sensitive with regard to its tendency to precipitate a mineral compound therefrom that the addition of a very small amount of alkali will produce the mineral compound required. It will be appreciated therefore that practically as soon as the cement comes into contact with the sensitive solution the precipitate will immediately be formed, in particular coating the fibrous material adequately so as to provide a link between the cement and the particles.

I claim:—

1. A process for utilizing fibrous materials in conjunction with cement, which consists in impregnating the said materials with a solution of a metallic salt, which is of such a degree of alkalinity that the minimum amount of alkali only need be added to produce the precipitation of a mineral compound, and then bringing the impregnated material and cement in contact, thereby producing a reaction in which precipitation of a solid compound takes place due to the presence of a precipitating agent in the cement for the purpose of closing the pores in the said materials and forming a connecting link between them and the said cement.

2. Process for utilizing wood in conjunction with cement, which consists in impregnating the wood with a solution of a metallic salt, which is of such a degree of alkalinity that the minimum amount of alkali only need be added to produce the precipitation of a mineral compound and then bringing the impregnated wood and cement into contact with each other, whereupon a solid compound is preciptated due to the presence of a precipitating agent in the cement, which closes the pores in the wood and forms a connecting link between the cement and the wood.

3. Process for utilizing wood in conjunction with cement, which consists in impregnating the wood with a solution of a metallic chloride, which is of such a degree of alkalinity that the minimum amount of alkali only need be added to produce the precipitation of a mineral compound, and then bringing the impregnated wood and cement into contact with each other, whereupon a solid compound is precipitated, which closes the pores in the wood and forms a connecting link between the cement and the wood.

4. Process for utilizing wood in conjunction with cement, which consists in impregnating the wood with a solution of an iron chloride, which is of such a degree of alkalinity that the minimum amount of alkali only need be added to produce the precipitation of a mineral compound, and then bringing the impregnated wood and cement into contact with each other, whereupon a solid compound is precipitated, which closes the pores in the wood and forms a connecting link between the cement and the wood.

5. A process of utilizing wood in conjunction with cement, which consists in rendering a solution of a metallic salt sensitive with regard to its tendency to precipitate a mineral compound therefrom by the addition of an alkaline substance to an extent such that a slight excess will provide a permanent precipitate, impregnating the wood with the sensitive salt solution, and then bringing into contact the impregnated wood and cement, whereon the lime constituent of the cement reacts with the absorbed solution and a solid compound is precipitated in and on the wood and on the cement, forming a connecting link therebetween.

6. Process of utilizing wood in conjunction with cement, which consists in rendering a solution of metallic salt sensitive with regard to its tendency to precipitate a mineral compound therefrom by the addition of a carbonate, to an extent such that a slight excess will provide a permanent precipitate, impregnating the wood with the sensitive salt solution, and then bringing into contact the impregnated wood and cement, whereon the lime constituent of the cement reacts with the absorbed solution, and a solid compound is precipitated in and on the wood and on the cement, forming a connecting link therebetween.

7. Process of manufacturing wood and cement compositions, which consists in impregnating sawdust with a solution of a metallic salt, which is of such a degree of alkalinity that the minimum amount of alkali only need be added to produce the precipitation of a mineral compound, and then mixing the impregnated sawdust with the cement, whereon a reaction takes place between the absorbed solution and the cement, and a solid compound is precipitated in and on the sawdust and on the cement, thereby linking the sawdust and cement.

8. Process of manufacturing wood and calcareous cement compositions, which consists in rendering a solution of metallic salt sensitive with regard to its tendency to precipitate a mineral compound therefrom by the addition of an alkali, to an extent such that a slight excess will provide a permanent precipitate, impregnating the wood with the sensitive salt solution, adding an aggregate to cement and mixing the cement and aggregate with the impregnated sawdust, whereon a solid compound is precipitated, mineralizing the sawdust and linking the sawdust to the cement and aggregate.

9. A process for utilizing wood in conjunction with aluminous cement, which consists in rendering a solution of metallic salt sensitive with regard to its tendency to precipitate a mineral compound therefrom by the addition of an alkali to an extent such that a slight excess will provide a permanent precipitate, impregnating the wood with the sensitive salt solution, and then bringing into contact the impregnated wood and the cement, whereupon a solid compound is precipitated due to the decomposition effected by the alkaline contents of the cement, and the solid compound is deposited in and on the wood and the cement, forming a connecting link therebetween.

10. A process for utilizing wood in conjunction with shale cement, which consists in rendering a solution of metallic salt sensitive with regard to its tendency to precipitate a mineral compound therefrom by the addition of an alkali to an extent such that a slight excess will provide a permanent precipitate, impregnating the wood with the sensitive salt solution, and then bringing into contact the impregnated wood and the shale cement, whereupon a solid compound is precipitated due to the decomposition effected by the alkaline contents of the shale cement and the solid compound is deposited in and on the wood and the cement, forming a connecting link there-between.

11. A process for utilizing absorbent fibrous materials in conjunction with cement, which consists in impregnating the said materials with a solution of a metallic salt, which is of such a degree of alkalinity that the minimum amount of alkali only need be added to produce the precipitation of a mineral compound, and then bringing the impregnated material into contact with cement in the presence of an additional alkali, thereby producing a reaction in which precipitation of a solid compound takes place for the purpose of closing the pores in the said materials and forming a connecting link between them and the said cement.

In testimony whereof I affix my signature.

JAMES RANKIN GARROW.